United States Patent
Backman et al.

(10) Patent No.: US 7,223,456 B2
(45) Date of Patent: May 29, 2007

(54) FLEXIBLE LAMINATED PLASTIC PIPE HAVING A CHLORINATED POLY(VINYL CHLORIDE) HOLLOW CORE

(75) Inventors: Arthur L. Backman, Broadview Heights, OH (US); Girish T. Dalal, Avon Lake, OH (US); Joseph J. Vontorcik, Broadview Heights, OH (US)

(73) Assignee: Noveon, Inc., Cleveland, OH (US)

( * ) Notice: Subject to any disclaimer, the term of this patent is extended or adjusted under 35 U.S.C. 154(b) by 0 days.

(21) Appl. No.: 10/803,247

(22) Filed: Mar. 18, 2004

(65) Prior Publication Data

US 2005/0208247 A1 Sep. 22, 2005

(51) Int. Cl.
*B29D 22/00* (2006.01)
*B29D 23/00* (2006.01)
*B32B 1/08* (2006.01)

(52) U.S. Cl. .................. 428/36.91; 428/36.6; 428/483; 138/141; 156/244.13; 156/244.11

(58) Field of Classification Search ............. 428/36.91, 428/483, 36.6; 138/137, 141; 156/244.13, 156/244.11
See application file for complete search history.

(56) References Cited

U.S. PATENT DOCUMENTS

| | | |
|---|---|---|
| 3,023,192 A | 2/1962 | Shivers, Jr. |
| 3,651,014 A | 3/1972 | Witsiepe |
| 3,763,109 A | 10/1973 | Witsiepe |
| 3,766,146 A | 10/1973 | Witsiepe |
| 3,784,520 A | 1/1974 | Hoeschele |

(Continued)

FOREIGN PATENT DOCUMENTS

EP 0 212 449 A2 3/1987

(Continued)

OTHER PUBLICATIONS

Elias, Hans-Georg, Midland Macromolecular Institute, Midland, MI, Translated from the German by Mary M. Exner, Gordon and Breach Science Publishers, "New Commercial Polymers 1969-1975, Polyesters", pp. 85-89.

(Continued)

*Primary Examiner*—Michael C. Miggins
(74) *Attorney, Agent, or Firm*—Joe A. Powell; Thoburn T. Dunlap; Samuel B. Laferty (57) ABSTRACT

A multi-layered pipe of arbitrary length and cross-section is produced by co-extrusion of a segmented thermoplastic copolyester elastomer (COPE) outer body over the exterior surface of an annular tubular core of CPVC/PVC having a wall thickness, measured in the radial direction, in the range from about 0.95 mm (38 mils) to about 1.375 mm (55 mils). The COPE is cohesively bonded to the annular core coextensively with essentially the entire length of the pipe. Though the COPE is easily degraded in contact with water, and CPVC and blends of CPVC with less than 25% by weight of PVC are typically rigid when extruded as pipe, a laminated pipe of COPE and CPVC/PVC with the specified wall dimensions and overall dimensions which in the laminated pipe satisfy an applicable plumbing code (SDR-11 in the U.S.) has essentially the same performance characteristics as commercially available CPVC pipe which is a monolayer and not a laminate.

12 Claims, 1 Drawing Sheet

U.S. PATENT DOCUMENTS

| | | | |
|---|---|---|---|
| 3,801,547 A | | 4/1974 | Hoeschele |
| 4,156,774 A | | 5/1979 | Buxbaum et al. |
| 4,264,761 A | | 4/1981 | McGirk |
| 4,349,469 A | | 9/1982 | Davis et al. |
| 4,355,155 A | | 10/1982 | Nelsen |
| 4,405,749 A | | 9/1983 | Nelsen |
| 4,569,973 A | | 2/1986 | Tyrell et al. |
| 5,366,257 A | * | 11/1994 | McPherson et al. ... 285/148.11 |
| 6,000,436 A | * | 12/1999 | Auvil et al. ................. 138/143 |
| 6,730,401 B2 | * | 5/2004 | Jackson et al. .......... 428/411.1 |
| 2003/0157321 A1 | | 8/2003 | Dalal et al. |

FOREIGN PATENT DOCUMENTS

| | | |
|---|---|---|
| EP | 1 262 312 A2 | 12/2002 |
| JP | 57116642 A | 7/1982 |
| JP | 07179717 A * | 7/1995 |
| JP | 2002254576 | 9/2002 |
| WO | WO 00/32974 A1 | 6/2000 |

OTHER PUBLICATIONS

Witsiepe, W.K., American Chemical Society, Advances in Chemistry Series 129 (edited by Norbert A.J. Platzer). 1973, "Polymerization Reactions And New Polymers", pp. 39-59.

* cited by examiner

FLEXIBLE LAMINATED PLASTIC PIPE HAVING A CHLORINATED POLY(VINYL CHLORIDE) HOLLOW CORE

FIELD

This invention relates to hollow tubing or pipe (hereafter "pipe" for brevity) of a segmented thermoplastic copolyester elastomer extruded over an annular core of a thin-walled vinyl chloride-based resin, specifically chlorinated PVC ("CPVC") optionally blended with less than 25% of poly (vinyl chloride) ("PVC"), for sustained use in potable water applications at a temperature in the range from above 0° C. to 82° C., and under pressure in the range from atmospheric to about 790 kPa (100 psig), for up to about 50 years.

The Problem

To produce pipe having a nominal diameter ("nom dia") in the range from 1.27 cm (0.5") to 5.08 cm (2.0") of a predominantly thermoplastic elastomer extruded over and laminated to a thin-walled annular core of solvent-cementable chlorinated PVC, thin enough to allow the laminate to be bent through such angle, at least 90°, at 23° C. (room temperature), or, over such radius as may be required for the task at hand without sacrificing the following critical requirements: (i) a service life over a period of about 50 years when carrying potable water under the above-stated temperature and pressure conditions; (ii) hydrostatic strength, on a pressure design basis, similar to CPVC maintained over the service life; (iii) better resistance to oxidative degradation than cross-linked polyethylene (PEX); and, (iv) the laminate has a wall thickness such that the dimensions of the pipe are consistent with the SDR (standard dimension ratio) requirements of the applicable plumbing code.

BACKGROUND OF THE INVENTION

Polyolefin pipe, and PEX in particular, currently in wide use, is flexible but may degrade by reaction with oxidizing agents, and diffusion of oxygen through the polyolefin, a combination, which over time, causes oxidative degradation. CPVC and/or blends of CPVC with less than 25% by weight of PVC (reference to "CPVC/PVC" specifies either CPVC or a blend of CPVC with <25% PVC, conventionally compounded; reference to "CPVC" specifies CPVC as conventionally compounded), optionally blended with another miscible polymer (other than PVC) in an amount insufficient to substantially change the flexibility of pipe made with CPVC or the CPVC/PVC blend, are highly resistant to oxidative degradation, and to attack by other aggressive chemicals ("chemical attack"), but is rigid when extruded as pipe. Rigidity is why piping made from highly degradation-resistant synthetic resinous materials or "plastics" such as CPVC/PVC is typically not used in domestic water distribution systems which require bending the pipe, because the combination of forces required to bend the pipe is likely to crack the pipe. To provide greater flexibility, plasticizer may be added to the blend, but toxicity requirements and long term performance will be affected.

Though rigid, sections of CPVC/PVC pipe and the appropriate fittings may be economically cemented together because they are solvent-cementable. A piping system so constructed performs its function at a level far in excess of the performance requirements of domestic water systems since the temperature of the water is relatively low, typically less than 100° C., and the pressure of the water is no more than about 790 kPa (100 psig). In particular, CPVC/PVC piping is negligibly susceptible to diffusion of oxygen and reaction with oxidizing agents, either from within or from outside the pipe.

From the foregoing, it is evident that the advantages of a PEX piping system are not available in a CPVC/PVC piping system; and, vice versa. Accordingly, much effort has been devoted to producing plastic pipe which has the advantages of both systems and the drawbacks of neither. However, any attempt to bond either CPVC/PVC to a polyolefin surface has proven unsatisfactory; and so have attempts to provide an intermediate adhesive layer.

A large portion of the favorable economics of chlorinated vinyl chloride-based pipe, that is, CPVC/PVC, derives from its solvent-cementability. It is this property which is sought in flexible extruded pipe because the overall cost of installation of such pipe is greatly decreased. However, to date, the significance of the fact that not all installations require the extreme flexibility of PEX pipe, has not been exploited. There are numerous installations in which the pipe needs to be bent no more than 90°, or, returned over an arc having a diameter in the range from 30.5 cm (1 ft) to 1.83 m (6 ft), which arc may be a function of the diameter of the pipe. The combination of these two considerations dictates that, in a twin-layered pipe in which a thin inner annular core is to be CPVC/PVC so as to protect an outer thick tubular layer from oxidative degradation from within the pipe, the elastomer for that outer layer remains to be chosen.

It is known that certain segmented thermoplastic copolyester elastomers ("COPE") commercially available under the trademark Hytrel® are flexible at low temperatures, tough and resilient, with good impact strength and flex fatigue, high resistance to creep and good retention of these properties at elevated temperatures and resistance to deterioration from many industrial chemicals, oils and solvents (see brochure titled "DuPont Hytrel® polyester elastomer—Extrusion Guide"). The brochure states "Experience has shown that Hytrel® is extremely compatible with most rigid and flexible PVC compounds, and equipment normally used to coextrude rigid and flexible PVC has given good results with Hytrel®. The lower melting point grades of Hytrel® generally give best results". The brochure refers to both rigid and flexible PVC, apparently overlooking that flexible PVC is plasticized, and the plasticizer migrating to the boundary between the PVC and Hytrel®, could eventually cause delamination. Moreover, the brochure fails to identify those grades of Hytrel® which are extremely compatible. However, since measured melting points of Hytrel® resins range from about 150° C. to 300° C., it is reasonable to ascertain that lower melting point grades are those in the range from about 150° C., but lower than 200° C. Nor does the brochure suggest how hydrolytically stable any particular Hytrel® may be over many years subjected to hot potable water under pressure; nor what tensile stress would be required for pipe carrying that potable water; nor that any one or more particular Hytrel® elastomers might provide a pressure design basis of 1380 kPa (200 psi) @ 82° C. for pipe which meets SDR-11 (standard dimension ratio) pipe dimensions, when tested in accordance with ASTM D-2837.

Nor does the brochure suggest which Hytrel® might be weldable or fusible to CPVC/PVC without substantially sacrificing flexibility of the laminate, and whether the laminate would not delaminate under operating conditions. Since the term "flexible pipe" is relative, when the term is used herein to define pipe which is CPVC/PVC, the term defines and refers to the ability of a pipe having a nominal diameter of 1.9 cm (0.75") to bend through an angle of at least 90° while meeting SDR-11 requirements, without damaging the integrity of the wall of the pipe.

Most of all, the brochure fails to suggest that even if one or more Hytrel® elastomers were found which met the requirement of minimum pressure design basis and tensile stress under the stated conditions, even those Hytrel® elastomers would be found to be susceptible to hydrolytic degradation. Such degradation is found to be exacerbated by oxidizing agents in potable water, after service for several thousand hours but less than the expected service life of 50 years.

A portion of the many "COPE" sold under the Hytrel® trademark are segmented copolyester elastomers disclosed in U.S. Pat. Nos. 3,023,192; 3,651,014; 3,763,109; 3,766,146; 3,784,520; 3,801,547; 4,264,761; inter alia. Useful COPE elastomers are also commercially available from producers other than E. I. duPont and disclosed in U.S. Pat. No. 4,156,774 to Ciba-Geigy; U.S. Pat. No. 4,349,469 to Eastman Kodak; U.S. Pat. Nos. 4,355,155 and 4,405,749 to GAF.

SUMMARY OF THE INVENTION

It has been discovered that sheathing a tube or pipe of normally rigid CPVC with a tube or pipe of a flexible segmented copolyester elastomers ("COPE") which disintegrates in prolonged contact with water at about 95° C. and has a much lower tensile stress than CPVC at 82° C. and 10% elongation, results in a cohesively bonded laminated tube or pipe (hereafter "pipe" for brevity) which is not only flexible but meets performance requirements over a period of 50 years. The CPVC may be blended with less than 25% PVC; and the COPE may be blended with a minor amount of a diluent polymer known to be miscible in COPE in an amount which does not decrease the tensile stress of the COPE.

Unlike PEX, which is commonly used for carrying potable water, COPE elastomers found suitable for the purpose may have a tensile stress as low as 500 psi at 82° C. and 10% elongation, but are unsuitable if the tensile stress is higher than about 4,000 psi at 23° C. (room temperature) at 10% elongation because they cannot be processed in substantially the same temperature range as CPVC/PVC.

As defined herein, a "flexible pipe" for hot and cold fluids is one provided with an outer tubular layer of an extrudable COPE elastomer bonded to an inner annular layer ("core") of CPVC/PVC to produce a twin-layered laminated pipe having a nom dia in the range from 1.27 cm (0.5") to 2.54 cm (1.0") which, at 23° C., can be bent at least 90° around a mandrel having a diameter no larger than 1.83 m (6 ft) without damaging the wall of the annular core. Though CPVC/PVC piping is normally rigid, a core having a wall thickness (measured in the radial direction) from 0.95 mm (0.038" or 38 mils) to 1.375 mm (0.055" or 55 mils) is thin-walled enough that it flexes adequately with the outer tubular layer of COPE, without cracking or delaminating. The outer tubular layer of COPE may have a wall thickness less than that of the inner tubular layer to allow the pipe to satisfy SDR-11 requirements for CPVC pipe. Since the outer COPE layer is flexible, it is critical that the inner tubular layer does not crack or delaminate. A core with a wall thickness in the aforementioned range, not only allows the pipe to meet the applicable plumbing code for CPVC but also allows sections of pipe to be joined by solvent-cementing them with appropriate fittings. The minimum thickness of 0.95 mm (38 mils) of CPVC/PVC is found to be critical to provide both, oxidation protection over 50 years and requisite solvent cementability in the field. The choice of CPVC/PVC for the annular core is limited to pipe in which the temperature of the water does not exceed about 82° C. continuously for 50 years.

Having found how to make a flexible laminate of COPE with a core of CPVC, there was no reason to expect that a thin-walled outer tubular layer of particular COPE resins (commercially available as Hytrel® resins) would meet the requirements of long term hydrostatic strength (LTHS), that is, the pressure design basis specified above; and, still further, also be coextrudable in the same temperature range as the chlorinated PVC. LTHS is generally a function of creep. A good indication of creep using short term experimentation is tensile stress. Therefore, it was required to find an elastomer with adequately high tensile stress at 82° C.

Only a COPE elastomer which melts in the narrow range from 190° C. to about 230° C., has a hardness in the range from 40 Shore D to 72 Shore D, tensile stress at 82° C. and 10% elongation in the range from about 500 psi to 2,200 psi measured as in ASTM D-638, 0.508 cm/min (0.2 in/min), and better high temperature performance than PE or PEX, is found suitable for the outer layer; such a COPE elastomer is thermally cohesively bondable to an underlying layer of CPVC/PVC to form a tubular laminate surprisingly well-suited to carry potable water, at a temperature in the range from about 5° C. to about 100° C. and a pressure in the range from about atmospheric pressure to about 790 kPa (100 psig) at a temperature of 82° C. for up to 50 years.

The flexible laminate is formed because it has been found that the thin-walled CPVC/PVC core is extrudable under substantially the same process conditions as the thick-walled outer COPE layer, so that when the core and outer tubular layer are co-extruded, they are also thermally cohesively bonded together. If desired, a third thin-walled layer of protective polymer may be formed by co-extrusion in a conventional coaxial extruder as described herein, to produce a thin-walled protective outer sheath of oxidation and temperature resistant polymer, e.g., CPVC/PVC which is less than 0.175 mm (7 mils) thick but provides the COPE elastomer protection from damage-causing conditions outside the pipe. Alternatively, a sheath of thermoplastic polyurethane ("TPU"), or Alcryn® (a partially crosslinked chlorinated olefin interpolymer alloy), less than 0.125 mm (5 mils) thick may be cohesively bonded to the outer surface of the COPE elastomer. Though flexibility of such tri-layer flexible pipe may be slightly less than that of the twin-layered COPE/(CPVC/PVC) pipe, it nevertheless has sufficient flexibility to satisfy the range set forth for the twin-layered pipe of the same nominal diameter.

Though the foregoing finding indicated the utility of a flexible COPE, numerous other flexible polymers failed to provide the same results; e.g., a core of CPVC/PVC sheathed with Estane® 58212 thermoplastic polyurethane elastomer failed to provide a flexible laminate which had an adequate LTHS when tested for even a relatively short time, that is, one year.

Flexible pipe is provided, having a nom dia in the range from about 1.27 cm (0.5") to about 2.54 cm (1.0"); having an annular core of CPVC/PVC, wherein the wall thickness of the core, measured in the radial direction, is preferably in the range from about 1 mm (40 mils) to about 1.375 mm (55 mils); and having an outer pipe of COPE elastomer overlying and cohesively bonded to the annular core so as to provide a combined wall thickness in the ranges mandated by dimensional conformance, and set forth in Table I below.

By limiting the wall thickness of the CPVC core, a pipe having a nom dia of 1.9 cm (0.75") it is found that a COPE/CPVC laminate may be bent 90° more easily than CPVC pipe having the same dimensions, as evidenced by the same force providing at least a 50% greater deflection of the COPE/CPVC laminate than with a CPVC pipe having the same dimensions. Further, for larger diameter pipe in the range from 2.54 cm (1.0") to 3.175 cm (1.25"), the COPE outer tubular layer not only allows the pipe to be bent through 90° but allows it to be bent to that degree around a mandrel having a diameter of no more than 1.83 m (6 ft), neither of which can be done on CPVC pipe using the same force.

A tri-layer pipe is provided having an outer tubular layer of COPE, a thin-walled annular core of CPVC/PVC, and a thin-walled protective outer sheath of CPVC/PVC, wherein the wall thickness of the outer sheath, measured in the radial direction, is in the range from about 250 µm (1 mil) to 0.5 mm (20 mils), yet the tri-layer pipe does not exceed the applicable plumbing code or SDR requirements.

Another tri-layer pipe is provided having an outer tubular layer of COPE, an inner tubular core of CPVC/PVC, and a thin-walled protective outer sheath in the range from about 0.025 mm (1 mil) to 0.175 mm (7 mils) thick, of TPU or Alcryn®, cohesively bonded to the outer tubular layer of COPE, without exceeding the applicable plumbing code or SDR-11 requirements.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Flexible piping, such as is commonly used for domestic hot and cold water systems of polyolefin ("PO") piping, such as of polyethylene ("PE"), or cross-linked PE (referred to as "PEX pipe"), depending upon the temperature and pressure of the water, are far more flexible than COPE/(CPVC/PVC) twin-layer pipe. Water at temperatures above 100° C., under pressure in the range from about 997 kPa (130 psig) to about 1135 kPa (150 psig), will rupture PE or PEX pipe. Attempts have been made to substitute more durable and less damage-prone flexible plastics for PO, particularly for PEX pipe, but with little success, mainly because extrudable flexible thermoplastics are susceptible to degradation by oxidizing agents in potable water systems.

The mechanical limitations of rigid CPVC pipe cannot be overcome. Thus, bonding a core of unplasticized CPVC/PVC to a flexible outer layer of plastic of any kind is contraindicated. Accordingly, there is no reason to expect that extruded unplasticized CPVC/PVC would be non-delaminatably, typically cohesively bonded, to a COPE surface in the temperature and pressure range at which the COPE is extruded. By "cohesive bond" is meant that the bond between the COPE and CPVC/PVC layers is so strong that peeling one layer from the other does not produce a clean separation of the different materials; instead, pieces of COPE adhere to the CPVC/PVC surface indicating the bond between molecules of COPE is weaker than the bond between molecules of COPE with CPVC/PVC. This is evident as an attempt to run the ASTM F 1281 ring peel test results in the COPE layer breaking before its bond to the underlying CPVC/PVC layer.

Recognizing that the COPE outer layer may be prone to degradation by chemical attack by external agents as well as those from within the pipe, it is desirable to cohesively bond an outer sheath of thermoplastic polyurethane or Alcryn® which is self-bondable to the COPE surface. Agents which cause COPE degradation include oxygen, oxidizing agents such as chlorine, and other degradants which are typically present, both in the atmosphere and in oxygenated water flowing in the pipe.

COPE elastomers which are suitable for use in the practice of the present invention have a hardness in the range from 40 to 72 Shore D. The term "COPE elastomer" as used herein, means a segmented polymer comprising about 30% to about 80% by weight of recurring linear etherester (soft) segments derived from difunctional polyether glycol and dicarboxylic acid and about 70% to about 20% by weight of recurring linear ester (hard) segments derived from organic diol and aromatic dicarboxylic acid. Polyether glycols having a number average molecular weight from about 350 to about 6000 are suitable with polyether glycols having a molecular weight between about 800 and 4000 being preferred.

COPE thermoplastics are segmented copolyester elastomers prepared by polymerizing with each other (a) one or more dicarboxylic acids or their equivalents (their esters or ester-forming derivatives such as acid chlorides, anhydrides, etc.), (b) one or more long chain glycols, and (c) one or more low molecular weight diols. Preferably, the segmented copolyester comprises (1) 5–90 wt % long chain ester units derived from at least one long chain glycol having a molecular weight of about 400–6000 and at least one low molecular weight dicarboxylic acid having a molecular weight less than about 300 and (2) 10–95 wt % short chain ester units derived from at least one low molecular weight diol having a molecular weight of less than about 250 and at least one low molecular weight dicarboxylic acid having a molecular weight of less than about 300.

For further details on the preparation, composition and properties of such COPE elastomers, see the aforementioned U.S. Pat. No. 3,023,192 et al, all assigned to E. I. duPont de Nemours and Company, the disclosures of which are hereby incorporated by reference thereto as if fully set forth herein.

Further information on Hytrel® elastomers is contained in New Commercial Polymers, 1969–1975, by Hans-Georg Elias, Midland Macromolecular Institute, Midland, Mich. 48640, translated from the German by Mary M. Exner; Gordon and Breach Science Publishers (New York, London and Paris) at pages 85 to 89, and in "Polymerization Reaction & New Polymers, "Segmented Polyester Thermoplastic Elastomers" by W. K. Witsiepe, published in Polymerization Reactions & New Polymers, at pages 39 to 59, Amer. Chem. Soc.—Advances in Chemistry Series No. 129 (edited by N. J. Platzer) 1973, the disclosures of which are hereby incorporated herein by reference.

In the particular embodiments of pipe described herein, reference is made to a cylindrical substantially COPE outer layer extruded over a cylindrical CPVC/PVC core at a temperature at which each layer is hot enough to be bonded to the other, using a conventional co-extruder, it being understood that, if desired, another outer layer (sheath) of CPVC/PVC or Alcryn® may be thermally cohesively bonded to the outer surface. By "substantially COPE" is meant that COPE is present in an amount of at least 70%, the remaining being a miscible polymer and/or stabilizer. Extrudable polymers which effectively bond to both COPE are most preferably TPU's and Alcryn®. Most preferred, for hot water service, is a core of conventionally compounded CPVC in which the CPVC resin has a Cl content in the range from about 65% to 70% by weight.

The COPE may be blended with a minor amount by weight of a miscible polymer or polyblend (blend of polymers) to enhance the COPE's physical properties. Preferred are interpolymers of an α-β-ethylenically unsaturated carboxylic acid anhydride with an ethylenically unsaturated comonomer, in an amount from about 0.1 to 30% by weight of the blend, so long as the amount of interpolymer will not adversely affect the tensile stress or adhesiveness of the blend. Preferred are anhydrides of the maleic anhydride series though other unsaturated anhydrides such as itaconic, allyl succinic, and the like, may also be used. A specific copolymer is styrene-maleic anhydride.

Any copolymerizable monomer containing a $>C=CH_2$ group may be used with the aforesaid anhydrides. Preferred are vinyl ethers, e.g., vinyl methyl ether; vinyl esters, e.g., vinyl acetate; vinyl halides, e.g., vinyl chloride; acrylic acid and esters, e.g., methyl acrylate; acrylic acid derivatives, e.g., methacrylic acid and esters; N-vinyl heterocycles, e.g., N-vinyl pyrrolidone; styrene; alkyl styrenes; vinylidene chloride; vinyl ketones, e.g., methyl vinyl ketone; lower $C_2$–$C_4$ olefins; 2,4,4-trimethyl pentene-1; hexene-1; 3-methylbutene and the like. Examples of specific interpolymers are: styrene-maleic anhydride; vinyl methyl ether-maleic anhydride; vinyl ethyl ether-maleic anhydride.

Preferred interpolymers have a minimum molecular weight of about 1000 and are characterized by specific viscosities in the range from about 0.1 to 5.0. The specific viscosity is determined with a solution of 1 g of interpolymer in 100 ml of methyl ethyl ketone at 25° C. The interpolymer is conventionally blended into the COPE in the solid state until a substantially homogeneous blend is obtained.

The outer layer of COPE is preferably stabilized against thermal and oxidative degradation by known thermal stabilizers, antioxidants, antiozonants and the like which may be present in the range from about 10 ppm to about 7 parts per hundred parts of COPE provided the concentration of the additive does not adversely affect the bonding of the COPE outer layer to the intermediate layer. The stabilizers are well known in the art and are incorporated into the resin either during extrusion or while in a hot melt stage following polymerization. Such stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state. Specific compounds are identified in U.S. Pat. No. 4,569,973, the relevant disclosure of which is incorporated by reference thereto as if fully set forth herein, most of which can be used in an amount in the range from about 0.1 to about 7 parts by weight. From 1 to about 5 parts by weight of lubricants such as paraffin waxes, low molecular weight polyethylene, oxidized polyethylenes, fatty acids and their salts, fatty alcohols, metal soaps, fatty amides, fatty esters, can be included to improve extrudability.

Commercially available COPE elastomers include Hytrel® polymers in the range of hardness of about 45 Shore D and tensile stress of 830 psi at 23° C. and 10% elongation, to a hardness of about 72 Shore D and tensile stress of 4,000 psi at 23° C. and 10% elongation which are extrudable in the temperature range from about 170° C. to about 250° C., without any objectionable degradation. Some of these Hytrel® elastomers are:

| | 10% elong @ 23° C. | | 10% elong @ 82° C. | | Hardness |
|---|---|---|---|---|---|
| | MPa | (psi) | MPa | (psi) | Shore D |
| 4556 | 6.573 | (954) | 3.410 | (495) | 45 |
| 5556 | 12.88 | (1870) | 7.303 | (1060) | 55 |
| 6356 | 20.53 | (2980) | 10.61 | (1540) | 63 |
| 7246 | 25.97 | (3770) | 13.64 | (1980) | 72 |

The tensile stress of these Hytrel® polymers decreases at 82° C. and 10% elongation to within a range of from about 500 psi for 45 Shore D to about 2,000 psi for 72 Shore D. Such elastomers are also available from Ticona under the Riteflex® brand as 655, 663 and 672 the Shore D hardness of which are 55, 63 and 72, respectively.

A convenient method for making the extrudate comprises feeding COPE pellets into a hopper of a single screw extruder equipped with a general purpose polyolefin processing screw, breaker plate and a multipurpose die having a side port fed by a second extruder into the hopper of which CPVC is fed. Hot CPVC extrudate is flowed over a mandrel in the die to form the core and thereafter, hot COPE is flowed over the core.

To produce the multilayer pipe of this invention, a co-extrusion process is used. In the co-extrusion process, two or more extruders are used, one extruder for each material or layer in the pipe. For a twin-layer pipe, two extruders are used; and for a trilayer pipe, three extruders are used. The extruders are typically displaced 90° from each other. The plural extruders feed into a multi-layer pipe die head such as is commercially available from Rollepaal and illustrated in their sales brochure.

The temperature of each of the plural zones along the longitudinal axial length of the die head allows the temperature of each zone to be adjusted so as to gradually heat the laminate being formed. A first extruder flows CPVC/PVC into a first port in the die head, and a second extruder flows COPE into a second port in the die head. From the first port, the CPVC/PVC flows over a frustoconical mandrel which is in open communication with an inner annular zone. From the second port, the COPE flows into distribution branches which are in open communication with an outer annular zone, and then over a cylindrical mandrel. When the outer tubular core of COPE contacts the outer surface of the inner CPVC/PVC pipe being formed, a twin-layer tubular laminate is formed in which the two layers are melt bonded together, or cohesively bonded, such than no adhesive is required. To retain its cylindrical shape and predetermined size, the twin-layer pipe is passed through sizing blocks as it is cooled below its melt temperature. The field of co-extrusion is a well known art and, for brevity, need not be described in greater detail in this specification.

Figure 1:
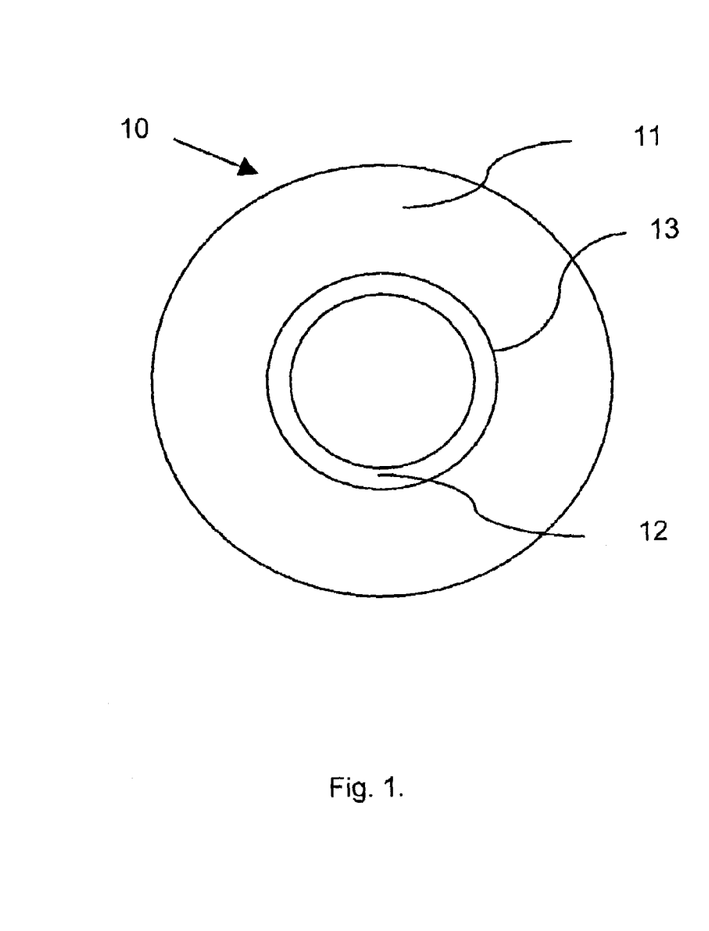
FIG. 1 is a cross-sectional view greatly enlarged and not to scale, of a twin-layer pipe having (i) an outer layer of COPE, and (ii) a core of CPVC/PVC.

Referring to FIG. 1, there is schematically illustrated a co-extruded multilayer pipe indicated generally by reference numeral 10, having an outer layer 11 and a core 12 cohesively bonded with the outer layer 11 at a circumferential interface 13. The core 12 is CPVC/PVC preferably having a wall thickness less than 2 mm thick, most preferably about 1 mm (40 mils) thick so that the hot extruded pipe may be cooled to 100° C. or less within 1 minute to avoid collapsing the pipe. When cooled to 20° C. the extruded CPVC/PVC core is flexible enough to be depressed under pressure applied by one finger of a person's hand.

The outer layer 11 may be any COPE which has an extrusion temperature in the same extrusion range as the CPVC/PVC, preferably from about 170° C. to 250° C. The COPE extrudate is uniformly distributed over the circumference of the core to provide the desired wall thickness of COPE in the laminate; for 2.54 cm (1 in) nominal diameter pipe the wall thickness is ≈3 mm (0.120"). When the hot laminate is cooled, it is found that the COPE is cohesively bonded to the CPVC core.

Since the outer sheath 11 need not be solvent-cementable, it may be a TPU. In another embodiment, a particular tri-layered pipe is formed by extruding a cylindrical outer thin-walled sheath about 0.025 mm (1 mil) thick, of a TPU, such as Estane® 58212 over the twin-layered COPE/(CPVC/PVC) pipe produced as described above to provide protection against exterior degradants without appreciably sacrificing flexibility.

Figure 2:
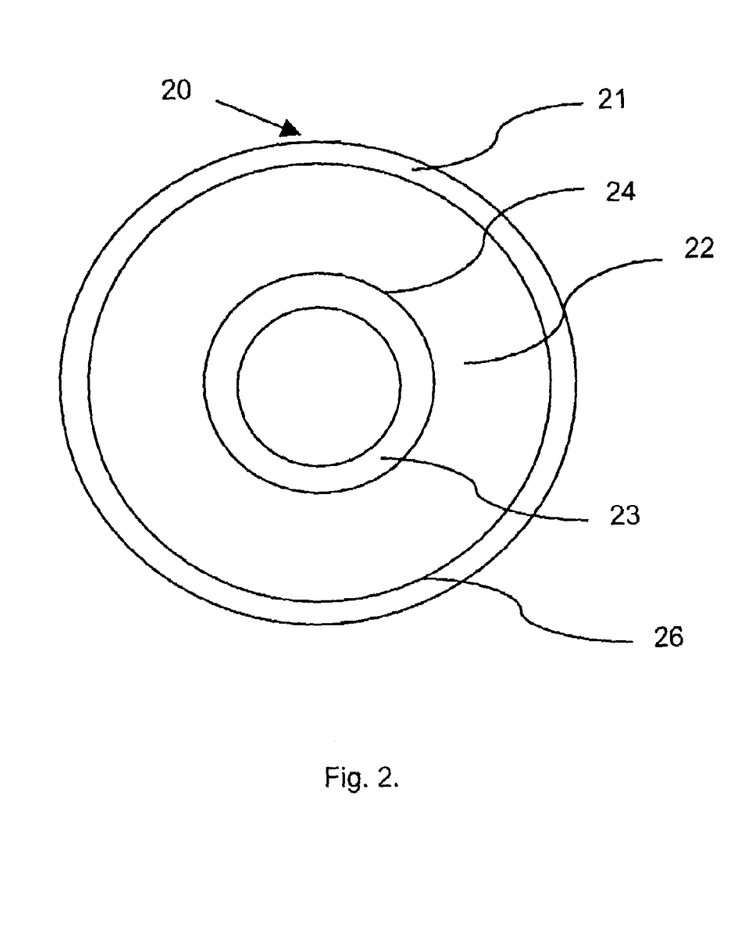
FIG. 2 is a cross-sectional view greatly enlarged and not to scale, of a tri-layer pipe having (i) an outer sheath of a thermoplastic polyurethane (ii) an underlying layer of COPE and (iv) a thin-walled core of CPVC/PVC.

Referring to FIG. 2, there is schematically illustrated a co-extruded tri-layer pipe indicated generally by reference numeral 20 having (i) a core 23 of CPVC/PVC, (ii) an outer layer 22 of COPE circumferentially cohesively bonded at 24 to core 23, and (iii) an outer sheath 21 of TPU circumferentially cohesively bonded at 26 to outer layer 22.

Three extruders are used to produce the tri-layer pipe, using a multiple head die having second and third side ports through which are fed second and third extrudates of COPE and TPU. A hot laminate is formed in a manner analogous to that described in the formation of twin-layered pipe with the COPE flowing through the second side port, and the hot laminate is coated with TPU fed through the third side port to uniformly coat the COPE with a sheath about 1 mil thick.

Plural sections of the laminate are conveniently connected by cementing one to another with a common coupling means of conventional design after coating both surfaces with a solvent-cement commonly containing tetrahydrofuran (THF).

Set forth below in Table I are dimensions for standard (monolayer) CPVC and multi-layer flexible pipe with CPVC/PVC as the inner layer, which dimensions meet SDR-11 pipe dimensions per ASTM D-2846.

TABLE I

Dimensions for Monolayer CPVC and Multi-layer Flexible Pipe with CPVC as the Inner Layer Meeting SDR-11 Pipe Dimensions per ASTM D-2846

| Nominal Tube or Pipe Size mm (in) | Outside Diameter mm (in) | CPVC Single Wall Thickness mm (in) | Flexible Multi-layer Pipe | | |
|---|---|---|---|---|---|
| | | | Inner CPVC Layer Thickness mm (in) | Outer COPE Layer Thickness mm (in) | Overall Wall Thickness mm (in) |
| 15 (1/2") | 15.9 ± 0.08 (0.625 ± 0.003) | 1.727–2.235 (0.068–0.088) | 0.965–1.397 (0.038–0.055) | 0.330–1.270 (0.013–0.050) | 1.727–2.235 (0.068–0.088) |
| 20 (3/4") | 22.2 ± 0.08 (0.875 ± 0.003) | 2.032–2.540 (0.080–0.100) | 0.965–1.397 (0.038–0.055) | 0.635–1.575 (0.025–0.062) | 2.032–2.540 (0.080–0.100) |
| 25 (1") | 28.6 ± 0.08 (1.125 ± 0.003) | 2.591–3.100 (0.102–0.122) | 0.965–1.524 (0.038–0.060) | 1.067–2.134 (0.042–0.084) | 2.591–3.100 (0.102–0.122) |
| 50 (2") | 54.0 ± 0.10 (2.125 ± 0.004) | 4.902–5.486 (0.193–0.216) | 0.965–2.032 (0.038–0.080) | 2.870–4.521 (0.113–0.178) | 4.902–5.486 (0.193–0.216) |

Measurement of Bending:

A simple apparatus is used to measure the flexibility sections of pipe of various compositions. A heavy wooden platform is secured to the upper surface of a table; one side of the platform is rounded so that the side has a 5.08 cm (2") radius. The edge of the table is rounded so that a section of pipe when deflected will not be bent over a sharp edge. A long horizontal metal bar is secured to the platform's upper surface. A longitudinal section of pipe is placed on the platform alongside the metal bar, and one end of the pipe extends, in the longitudinal direction, for a chosen distance, over the rounded side of the platform. The section of pipe on the platform is clamped or otherwise secured on the platform's surface so that only that portion of the pipe cantilevered over the platform is free to bend. A metal ruler is secured in a vertical position near the extended end of the bar to measure the downward deflection of the end of the pipe when it is weighted. Pipe samples having SDR-11 dimensions for CPVC pipe having a nominal diameter of 1.9 cm (0.75"), respectively, are secured to the platform along its length on the table, and the length which extends beyond the rounded edge is chosen to be 60.96 cm (24"). A 4.54 kg (10 lb) weight is added to the end of the pipe and the amount of deflection measured at the end of the section of pipe cantilevered over the edge of the table, is recorded after approximately 30 seconds. Table II below sets forth the results of deflection, each obtained with a section of 19.05 mm (0.75") nom dia pipe of a specified different configuration of material, and each meeting SDR-11 specifications for CPVC.

TABLE II

Flexibility Testing of Various Piping Systems

|  | Commercial CPVC | Flexible Pipe 1 | Flexible Pipe 2 | Flexible Pipe 3 | Commercial monolayer PEX | Commercial Multi-layer PEX |
|---|---|---|---|---|---|---|
| Deflection | 8.0" | 13.8" | 12.9" | 12.8" | 19.0" | 19.1" |
|  | 20.32 cm | 35.05 cm | 32.77 cm | 32.51 cm | 48.26 cm | 48.51 cm |
| % Increase vs. CPVC Control | — | 72.5% | 61.3% | 60.0% | 137.5% | 138.8% |

Commercial CPVC: 19.05 mm (3/4") nom dia SDR-11 FlowGuard Gold ®
Flexible Pipe 1: TempRite ® 3105 CPVC wall = 0.050", COPE wall = 0.033", COPE is Hytrel ® 4556
Flexible Pipe 2: TempRite ® 3105 CPVC wall = 0.052", COPE wall = 0.036", COPE is Hytrel ® 5556
Flexible Pipe 3: TempRite ® 3105 CPVC wall = 0.054", COPE wall = 0.038", COPE is Hytrel ® 5556 melt blended with 20 wt % of Dylark ® 332 styrene/maleic anhydride copolymer (from Nova Chemicals)
Commercial monolayer PEX: AQUAPEX ™ manufactured by Wirsbo.
Commercial Multi-layer PEX: SUPERPEX ™ manufactured by Bow Plastics.

As is evidenced from the data above, each of the twin-layer pipe sections has a deflection at least 60% greater than that obtained with CPVC. Therefore, twin-layer pipe is deemed to be flexible when it can be deflected under the conditions specified above in an amount at least 50% greater than the corresponding CPVC pipe which meets SDR-11 specifications; and CPVC pipe is deemed "rigid" when a 19.05 mm (0.75") nom dia section of pipe meeting SDR-11 specifications is deflected no more than about 23.2 mm (8") under bending test conditions specified above.

In the following illustrative examples showing how various specific types of pipe are made, reference to "parts" refers to parts by weight unless otherwise indicated.

EXAMPLE 1

Co-Extrusion of Twin-Layer CPVC and COPE Pipe

A twin layer pipe illustrated in FIG. 1 is made by co-extruding a CPVC inner tubular layer and a COPE outer tubular layer. Internal components of a 19.1 mm (¾" nominal) extrusion die were modified by configuring the plate to allow for a two-layer piping structure.

A commercially available CPVC compound (TempRite® 3105) was fed into a Leistritz 27 twin screw extruder. Processing conditions for extrusion of CPVC are set forth in Table III below:

TABLE III

| Variable | Conditions |
|---|---|
| Barrel zone 1 setpoint | 193.3° C. (380° F.) |
| Barrel zone 2 setpoint | 193.3° C. (380° F.) |
| Barrel zone 3 setpoint | 193.3° C. (380° F.) |
| Barrel zone 4 setpoint | 193.3° C. (380° F.) |
| Barrel zone 5 setpoint | 193.3° C. (380° F.) |
| Barrel zone 6 setpoint | 193.3° C. (380° F.) |
| Barrel zone 7 setpoint | 193.3° C. (380° F.) |
| Adapter setpoint | 193.3° C. (380° F.) |
| Die zone 1 setpoint | 204.4° C. (400° F.) |
| Screw RPM | 60 |
| Screw Amps | 60 |

A 1½" Davis-Standard (general designation) single screw extruder was used to extrude the outer COPE layer. The COPE resin (Hytrel® 4556 from DuPont) had a hardness of 45 D measured according to ASTM D2240. Pellets of the COPE were dried overnight at 90° C. and are fed into a hopper located on the extruder. The extruder is equipped with a general purpose polyolefin processing screw and breaker plate. Processing conditions for extrusion of the Hytrel® resin are set forth in Table IV below:

TABLE IV

| Variable | Conditions |
|---|---|
| Barrel zone 1 setpoint | 212.8° C. (415° F.) |
| Barrel zone 2 setpoint | 218.3° C. (425° F.) |
| Barrel zone 3 setpoint | 221.1° C. (430° F.) |
| Barrel zone 4 setpoint | 221.1° C. (430° F.) |
| Clamp setpoint | 221.1° C. (430° F.) |
| Die zone 1 setpoint | 221.1° C. (430° F.) |
| Screw RPM | 18.1 |
| Screw Amps | 7.3 |

The twin layer pipe was co-extruded at a rate of 18 kg/hr, having an average inner CPVC layer thickness of 0.050" (1.27 mm) and an average outer COPE layer thickness of 0.034" (0.86 mm). The average outside diameter was 0.875" (22.23 mm).

EXAMPLE 2

Hytrel® 5556 resin (hardness of 55D per ASTM D-2240) is premixed with 20 wt. % Dylark® 332 from Nova Chemicals and fed into a Werner Pfleiderer WP-30 twin screw extruder. The blend was melt mixed in the extruder and processed into pellets under the conditions presented in Table V:

TABLE V

| Variable | Conditions |
|---|---|
| Barrel zone 1 setpoint | 193.3° C. (380° F.) |
| Barrel zone 2 setpoint | 204.4° C. (400° F.) |
| Barrel zone 3 setpoint | 215.6° C. (420° F.) |
| Barrel zone 4 setpoint | 215.6° C. (420° F.) |
| Die zone 1 setpoint | 215.6° C. (420° F.) |
| Screw RPM | 280 |
| Screw Amps | 75 |

The pellets of the COPE were dried overnight at 90° C. and were fed into a hopper located on the same 1½" Davis Standard extruder as above and extruded into 2-layer pipe under the same conditions as in Tables III and IV. The twin layer pipe was co-extruded at a rate of 17.5 kg/hr, having an average CPVC inner layer (wall thickness) of 1.37 mm (0.054") and an average COPE outer layer thickness of 0.97 mm (0.038"). The average outside diameter was 22.23 mm (0.875").

EXAMPLE 3

Comparison of Long Term Performance:

The estimated long term performance of twin-layer 19.05 mm (¾") pipe samples is compared to that of monolayer CPVC. The maximum pressure rating for monolayer CPVC pipe in SDR-11 dimensions is 689 kPa (100 psi) at 82° C. (180° F.) as shown in Table VII below. The maximum pressure rating for several twin-layer pipes was determined via the use of a pressure design basis (PDB) as specified in the Plastics Pipe Institute TR-3 and TR-4 policies. Medium term (~4000 hours) hydrostatic pressure testing was conducted in accordance with ASTM D-2837 at 82° C. (180° F.) to predict the 100,000 hour intercept point known as the long term hydrostatic (LTHP) pressure value. This value is the estimated pressure in the pipe which will cause failure of the pipe at 100,000 hours. The LTHP is categorized analogously to long term hydrostatic strength (LTHS) as shown in Table 1 in ASTM D-2837 to yield a pressure design basis (PDB). An LTHP between 1309–1585 kPa (190–230 psi) falls into the 1378 kPa (200 psi) PDB category. A LTHP between 1653–1998 kPa (240–290 psi) falls into the 1722 kPa (250 psi) PDB category. The maximum pressure rating of the pipe is the PDB multiplied by a safety factor of 0.5. Hence, for the above PDB values of 1378 kPa (200 psi) and 1722 kPa (250 psi), the maximum pressure ratings are 689 kPa (100 psi) and 861 kPa (125 psi), respectively.

In the following Table VI, the identification of pipe samples corresponds to that in Table II above.

TABLE VI

| Sample Type | Long Term Hydrostatic Pressure @ 82° C. (psi) | Pressure Design Basis @ 82° C. (psi) | Maximum Pressure Rating @ 82° C. (psi) |
| --- | --- | --- | --- |
| Flexible Pipe 1 | 210 | 200 | 100 |
| Flexible Pipe 2 | 230 | 200 | 100 |
| Flexible Pipe 3 | 221 | 200 | 100 |

TABLE VII

| Sample Type | *Hydrostatic Design Basis (psi) | *Hydrostatic Design Stress (psi) | *Maximum Pressure Rating @ 82° C. (psi) |
| --- | --- | --- | --- |
| Monolayer CPVC (SDR-11) | 1000 | 500 | 100 |

*From ASTM D-2846, Chlorinated Poly(Vinyl Chloride) (CPVC) Plastic Hot-and Cold-Water Distribution Systems.

The foregoing data provides evidence that each of the three twin-layer sections of pipe identified have a maximum pressure rating at 82° C. substantially the same as that of commercially available monolayer CPVC.

EXAMPLE 4

Recipe for CPVC/PVC Blend Used as Tubular Core:

In this example a PVC/CPVC blend is used as the inner tubular core. The recipe is shown in the following Table VII:

TABLE VIII

| Ingredient | Parts |
| --- | --- |
| TempRite ® 674x571 CPVC | 100 |
| Dibutyl tin bis-(2-ethylhexylmercaptoacetate) | 2.4 |
| CPE, Tyrin ® 3611P | 2 |
| CPE1, Tyrin ® 4211P | 1.5 |
| Oxidized Polyethylene | 1 |
| Fischer Tropsch Wax | 0.5 |
| Paraloid ® KM-330 | 4 |
| $TiO_2$ | 5 |
| PVC, BCP-65 | 10 |

This composition is blended on powder mixing equipment and co-extruded with Hytrel® 5556 under identical conditions as in Tables III and IV. A twin layer pipe is co-extruded at a rate of 18 kg/hr, with an inner CPVC layer having an average wall thickness of 1.27 mm (0.052") and an average outer COPE layer thickness of 0.86 mm (0.032"). The average outside diameter is 22.23 mm (0.875").

EXAMPLE V

A tri-layer pipe illustrated in FIG. 4 is made by co-extruding a CPVC inner layer, a COPE middle layer and a partially cross-linked, chlorinated olefin interpolymer alloy as the outer layer. Internal components of a 19.1 mm (¾" nominal) extrusion die were modified by configuring the plate to allow for a tri-layer piping structure.

A commercially available CPVC compound (TempRite® 3105) was fed into a Leistritz 27 twin screw extruder. Processing conditions are set forth in Table IX below:

TABLE IX

| Variable | Conditions |
| --- | --- |
| Barrel zone 1 setpoint | 193.3° C. (380° F.) |
| Barrel zone 2 setpoint | 193.3° C. (380° F.) |
| Barrel zone 3 setpoint | 193.3° C. (380° F.) |
| Barrel zone 4 setpoint | 193.3° C. (380° F.) |
| Barrel zone 5 setpoint | 193.3° C. (380° F.) |
| Barrel zone 6 setpoint | 193.3° C. (380° F.) |
| Barrel zone 7 setpoint | 193.3° C. (380° F.) |
| Adapter setpoint | 193.3° C. (380° F.) |
| Die zone 1 setpoint | 204.4° C. (400° F.) |
| Screw RPM | 78 |
| Screw Amps | 24 |

A 1½" Davis-Standard (general designation) single screw extruder is used to extrude the middle COPE layer. Pellets of COPE (Hytrel® 5556 resin from DuPont, hardness 55 Shore D, measured according to ASTM D2240) are dried overnight at 90° C. and fed into a hopper of the extruder. The extruder is equipped with a general purpose processing screw and breaker plate. Processing conditions are set forth in Table X below:

TABLE X

| Variable | Conditions |
| --- | --- |
| Barrel zone 1 setpoint | 215.6° C. (420° F.) |
| Barrel zone 2 setpoint | 221.1° C. (430° F.) |
| Barrel zone 3 setpoint | 223.9° C. (435° F.) |
| Barrel zone 4 setpoint | 223.9° C. (435° F.) |
| Clamp setpoint | 221.1° C. (430° F.) |
| Die zone 1 setpoint | 221.1° C. (430° F.) |
| Screw RPM | 17.7 |
| Screw Amps | 12.3 |

A ¾" Davis-Standard (general designation) single screw extruder is used to extrude partially cross-linked, chlorinated olefin interpolymer alloy (Alcryn® 2080C. from Advanced Polymer Alloys) as the outer layer. Pellets of the interpolymer alloy are fed into a hopper of the extruder. The extruder is equipped with a general purpose processing screw and breaker plate. Processing conditions are set forth in the Table XI below:

TABLE XI

| Variable | Conditions |
| --- | --- |
| Barrel zone 1 setpoint | 187.8° C. (370° F.) |
| Barrel zone 2 setpoint | 187.8° C. (370° F.) |
| Barrel zone 3 setpoint | 187.8° C. (370° F.) |
| Clamp setpoint | 187.8° C. (370° F.) |
| Screw RPM | 11.8 |
| Screw Amps | 40 |

A tri-layer pipe is co-extruded at a rate of 13 kg/hr, having an inner CPVC layer with an average wall thickness of 1.17 mm (0.046", an average middle COPE layer thickness of 0.86 mm (0.034") and an average outer partially cross-linked, chlorinated olefin interpolymer alloy layer of 0.13 mm (0.005"). The average outside diameter is 22.30 mm (0.878").

While certain representative embodiments and details have been shown for the purpose of illustrating the invention, it will be apparent to those skilled in this art that various changes and modifications may be made therein without departing from the spirit or scope of the invention.

What is claimed is:

1. A multilayer pipe comprising,
   (i) an outer layer comprising a segmented thermoplastic copolyester elastomer; and,
   (ii) an annular core comprising chlorinated poly(vinyl chloride) ("CPVC") blended with less than 25% by weight poly(vinyl chloride) ("PVC"), the annular core being coextensive with essentially the entire length of the body;
   the outer layer being cohesively bonded to the annular core to form a laminate; and,
   the copolyester elastomer comprising (a) one or more dicarboxylic acids, (b) one or more long chain glycols, and (c) one or more low molecular weight diols.

2. The multilayer pipe of claim 1 wherein said pipe is a twin-layered pipe, and the copolyester elastomer comprises (1) 5–90 wt. % long chain ester units derived from at least one long chain glycol having a molecular weight of about 400–6000 and at least one low molecular weight dicarboxylic acid having a molecular weight less than about 300 and (2) 10–95 wt. % short chain ester units derived from at least one low molecular weight diol having a molecular weight of less than about 250 and at least one low molecular weight dicarboxylic acid having a molecular weight of less than about 300;
   the copolyester elastomer has a hardness in the range from about 40–72 Shore D;
   tensile stress at 82° C. and 10% elongation in the range from about 500 psi to 2,200 psi measured as in ASTM D-638, 0.508 cm/mm (0.2 in/mm); and,
   is extrudable at a temperature in the range from about 170° C. to about 250° C.

3. The twin-layered pipe of claim 2 wherein the annular inner core has a thickness, measured in the radial direction, in the range from 0.95 mm (38 mils) to 1.375 mm (55 mils).

4. The twin-layered pipe of claim 3 wherein the annular core is CPVC and the pipe has a nominal diameter in the range from 1.27 cm (0.5") to 2.54 cm (1.0") which pipe, at 23° C., can be bent at least 90° around a mandrel having a diameter no larger than 1.83 m (6 ft) without damaging the wall of the annular core.

5. The twin-layered pipe of claim 4 wherein the annular core is CPVC the pipe has a nominal diameter of 19.05 mm (0.75") and is flexible to an extent that a 4.54 kg (10 lb) weight at the end of a cantilevered section of pipe 24" long causes a deflection measured at the end of the pipe and recorded after approximately 30 seconds, is at least 50% greater than the deflection for a CPVC pipe of corresponding dimensions.

6. The twin-layered pipe of claim 2 wherein the copolyester elastomer is thermally cohesively bonded to an outer sheath of a polymer selected from the group consisting of a thermoplastic polyurethane, a blend of CPVC and PVC, and an alloy of a partially crosslinked chlorinated olefin interpolymer.

7. The twin-layered pipe of claim 2 wherein the outer tubular layer is copolyester elastomer blended with a miscible interpolymer of an α-β-ethylenically unsaturated carboxylic acid anhydride with an ethylenically unsaturated comonomner, in an amount from about 0.1 to 30% by weight of the blend, so long as the amount of interpolymer will not adversely affect the tensile stress or adhesiveness of the blend.

8. A method of producing an elongated pipe comprising, concurrently extruding an annular core comprising chlorinated poly(vinyl chloride) (CPVC) blended with less than 25% by weight poly(vinyl chloride) (PVC) in a substantially uniform thickness, measured in the radial direction, in the range from 0.95 mm (38 mils) to 1.375 mm (55 mils), and an outer tubular layer comprising a segmented thermoplastic copolyester elastomer having a hardness in the range from about 40–72 Shore D overlying the annular core in a substantially uniform thickness coextensive with substantially the entire length of the body cohesively bonded to the core.

9. The method of claim 8 wherein the copolyester elastomer is derived by polymerizing with each other (a) one or more dicarboxylic acids, (b) one or more long chain glycols, and (c) one or more low molecular weight diols.

10. The method of claim 9 wherein the copolyester elastomer comprises (1) 5–90 wt % long chain ester units derived from at least one long chain glycol having a molecular weight of about 400–6000 and at least one low molecular weight dicarboxylic acid having a molecular weight less than about 300 and (2) 10–95 wt % short chain ester units derived from at least one low molecular weight diol having a molecular weight of less than about 250 and at least one low molecular weight dicarboxylic acid having a molecular weight of less than about 300;

the copolyester elastomer has a hardness in the range from about 40–72 Shore D;

tensile stress at 82° C. and 10% elongation in the range from about 500 psi to 2,200 psi measured as in ASTM D-638, 0.508 cm/mm (0.2 in/min); and, is extrudable at a temperature in the range from about 170° C. to about 250° C.

11. The method of claim 10 wherein the copolyester elastomer is blended with a miscible interpolymer of an α-β-ethylenically unsaturated carboxylic acid anhydride with an ethylenically unsaturated comonomer, in an amount from about 0.1 to 30% by weight of the blend, so long as the amount of interpolymer will not adversely affect the tensile stress or adhesiveness of the blend.

12. The method of claim 11 including coextruding an outer sheath coextensively cohesively bonded to and overlying the outer tubular layer, the outer sheath being an oxidation-resistant polymer less than 0.125 mm (5 mils) thick, selected from the group consisting of a thermoplastic polyurethane, a blend of CPVC and PVC, and an alloy of a partially crosslinked chlorinated olefin interpolymer.

* * * * *